United States Patent [19]

Mueller

[11] 4,263,824

[45] Apr. 28, 1981

[54] DIFFERENTIAL DEVICE

[75] Inventor: James F. Mueller, Lakewood, Ohio

[73] Assignee: Eaton Corporation, Cleveland, Ohio

[21] Appl. No.: 725,596

[22] Filed: Sep. 22, 1976

[51] Int. Cl.³ .............................................. F16H 1/44
[52] U.S. Cl. ....................................... 74/711; 74/710.5
[58] Field of Search ................................ 74/711, 710.5

[56] References Cited

U.S. PATENT DOCUMENTS

| 2,234,890 | 3/1941 | Brousseau | 74/710.5 |
|---|---|---|---|
| 3,138,970 | 6/1964 | Costa et al. | 74/711 |
| 3,388,760 | 6/1968 | Christie | 74/650 X |
| 3,473,120 | 10/1969 | Ruof | 188/181 A |
| 3,683,219 | 8/1972 | Kruse | 188/181 A X |
| 3,732,752 | 5/1973 | Louckes et al. | 74/710.5 |
| 3,762,503 | 10/1973 | Wilder et al. | 74/711 X |
| 3,769,533 | 10/1973 | Pauwels | 74/711 X |
| 3,845,671 | 11/1974 | Sharp et al. | 74/711 X |
| 3,871,249 | 3/1975 | Jeffers | 74/711 |
| 3,966,267 | 6/1976 | McNinch, Jr. et al. | 303/106 |

Primary Examiner—Leslie Braun
Attorney, Agent, or Firm—R. J. McCloskey; H. D. Gordon

[57] ABSTRACT

A differential mechanism such as a limited slip differential mechanism which is automatically engageable or disengageable in response to preselected conditions and through a clutch arrangement controls the relative rotative speeds of the vehicle wheels and related axle shafts. A single sensor is utilized to sense the angular velocity of a gear, such as a drive axle ring gear, and provides a first signal proportional to the velocity of the monitored gear. A control converts the first signal into a second signal proportional to angular acceleration of the monitored gear and will cause the actuator to engage the clutch when acceleration of the monitored gear, or related member, exceeds a predetermined maximum.

16 Claims, 4 Drawing Figures

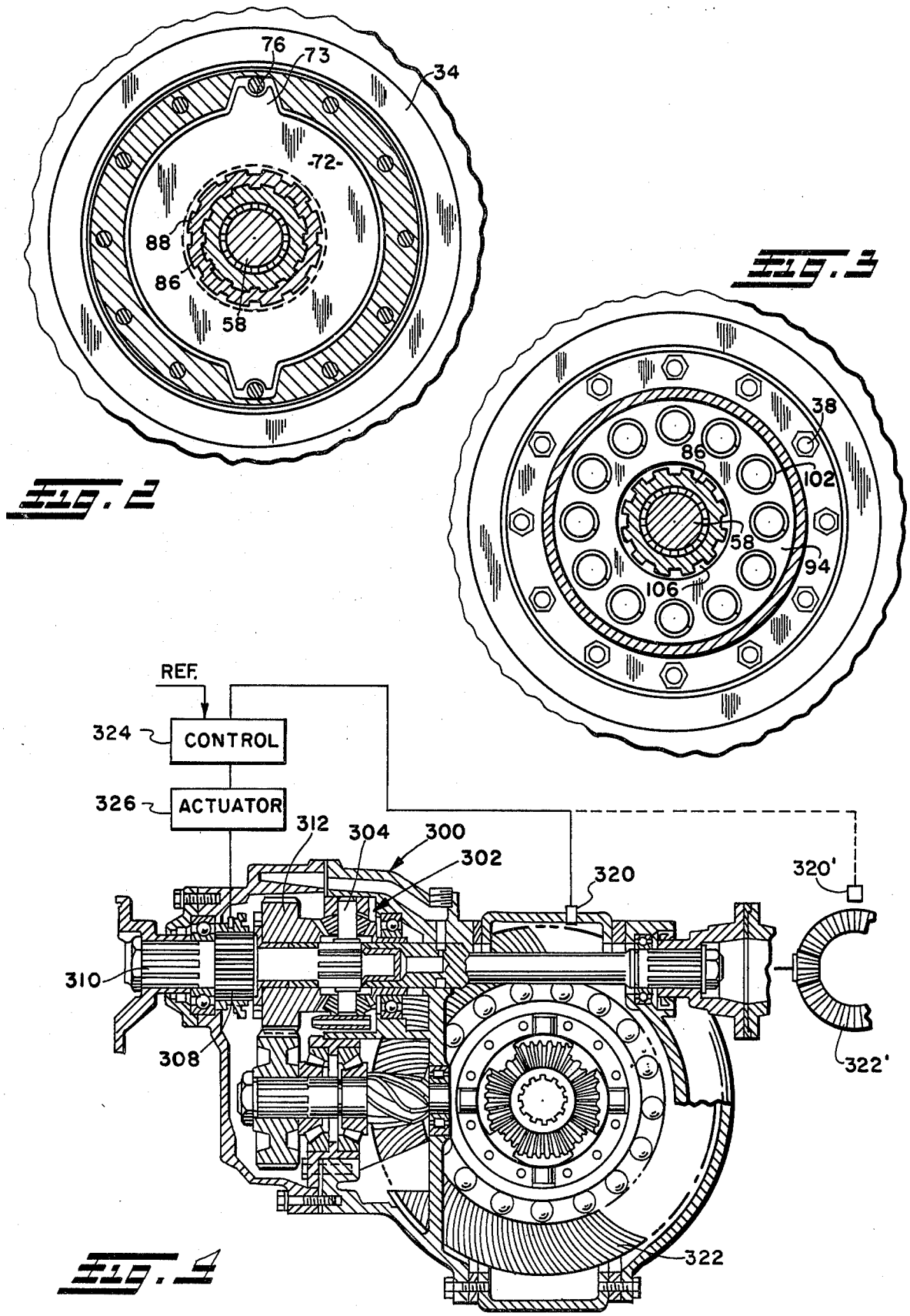

DIFFERENTIAL DEVICE

BACKGROUND OF THE INVENTION

1. Field of Invention

The present invention relates to automatically engageable and disengageable differential inhibiting devices and more particularly relates to limited slip differential devices utilizing friction disc clutch arrangements and a single sensor for sensing the acceleration of a monitored gear, or related member, and a control for engaging the disc clutch when the acceleration of the monitored gear exceeds a predetermined maximum value. More particularly, this invention relates to an automatically engageable and disengageable limited slip differential for a drive axle which includes a friction disc clutch which will be automatically engaged or disengaged dependent upon ring gear acceleration.

2. Description of the Prior Art

The advantages of a differential inhibiting device such as a limited differential arrangement of the interaxle or final drive of a vehicle are well known. A conventional vehicle differential allows a difference in angular velocity between two driving wheels while turning corners; however, if one of the driving wheels encounters poor traction on a slippery surface, such will tend to cause the wheel to spin and thus limit total driving torque to twice that of the spinning wheel causing the opposite wheel to remain stationary. This operating condition, generally referred to as a "spin out", is encountered when a vehicle has one of its driving wheels bearing on an icy or slippery spot on the roadway, while the other wheels are contacting and/or bearing on a surface having a greater coefficient of friction. Under such circumstances, a relatively low wheel torque will cause the wheel which bears on the slippery surface to spin and a torque equal in magnitude to this low torque will be all the torque available to the wheel on the drive pavement and/or surface of greater coefficient of friction, which will more than likely be insufficient to move the vehicle. Well known means are often provided for automatically reducing or eliminating the normal action of the axle differential.

In conventional types of limited slip differentials employing friction clutch discs the friction discs are generally continuously loaded by compression springs and/or similar conventional force loading apparatus. However, these previous friction clutch devices are usually continuously, operatively engaged, even though the majority of the time such a device is not required. Accordingly, such friction clutch devices are continuously subjected to extreme and detrimental wear which results in frequent repair and replacement thereof. Moreover, these prior art spring biased friction clutches are generally disposed about one or both of the output axle shafts and are operatively positioned in the throat section of the axle housing. Structurally locating the spring biased friction clutch in this manner generally requires an extremely large number of friction discs and a corresponding increase in the spring rate and/or load to effectively achieve reasonable clutching action.

An improved limited slip differential device is described in U.S. Pat. No. 3,448,635, issued Mar. 27, 1967, assigned to the assignee of this application, and hereby incorporated by reference. While the limited slip differential described in U.S. Pat. No. 3,448,635 provided improved mechanical characteristics, the device did require manual actuation by the vehicle operator.

Other differential devices, such as illustrated in U.S. Pat. No. 3,138,970, utilized automatic means to positively lock a differential, or to apply a friction clutch in a limited slip differential device. These devices have not been totally satisfactory as at least two sensors, one for each axle shaft, are usually required. Providing two sensors introduces additional costs, additional circuitry and the like. Further, such devices usually sensed axle rotation and were normally located at the outer ends of the axle housing and were thus more subject to the jolting often experienced by a vehicle axle. U.S. Pat. Nos. 3,473,120; 6,683,219; 3,732,752; 3,845,671 and 3,871,249 are representative of the prior art devices. Also, many of these prior art devices were less than totally satisfactory as they were speed sensitive devices which might lock up the differential, or engage the limited slip clutch discs, during a high speed turn when both wheels were rolling substantially without slippage and full differential action was desired to prevent undue tire wear, excessive stress to the differential mechanism and the like.

SUMMARY OF THE INVENTION

In accordance with the present invention, many of the drawbacks of the prior art have been overcome to the extent that a limited slip, or lock up, differential mechanism is provided which requires only a single sensor to sense undesirable spin out to activate the limited slip friction clutch or positive lock up mechanism. The single sensor provides a first signal proportional to angular velocity of a monitored member, preferably the driven ring gear. The first signal is converted into a second signal proportional to acceleration of the monitored member. Applicant has found that ring gear acceleration exceeding predetermined values is an accurate indication of undesired spin out and thus a single sensor may be utilized to provide an indicator of a spin out to activate the differential inhibiting device. That is, under given conditions, acceleration of various gears, such as the ring gear, is not expected to exceed a given value in the absence of a spin out condition.

Accordingly, it is an object of the present invention to provide a new and improved automatic limited slip, or lock up, differential mechanism.

A further object of the present invention is to provide an automatically engageable and disengageable limited slip, or lock up, differential mechanism which requires only a single sensor.

Another object of the present invention is to provide an automatically engaged and disengaged limited slip, or lock up, differential mechanism which is responsive to ring gear acceleration.

These and other objects and advantages of the present invention will become apparent from a reading of the Description of the Preferred Embodiment taken together with Drawings.

BRIEF DESCRIPTION OF THE DRAWINGS

FIG. 2 is a detailed sectional view taken along line 2—2 of FIG. 1;

FIG. 3 is a sectional view taken along line 3—3 of FIG. 1;

FIG. 4 is a cross-sectional view of an alternate embodiment of the present invention as utilized in connection with a locking type differential for a tandem axle mechanism.

DESCRIPTION OF THE PREFERRED EMBODIMENT

Figure 1:
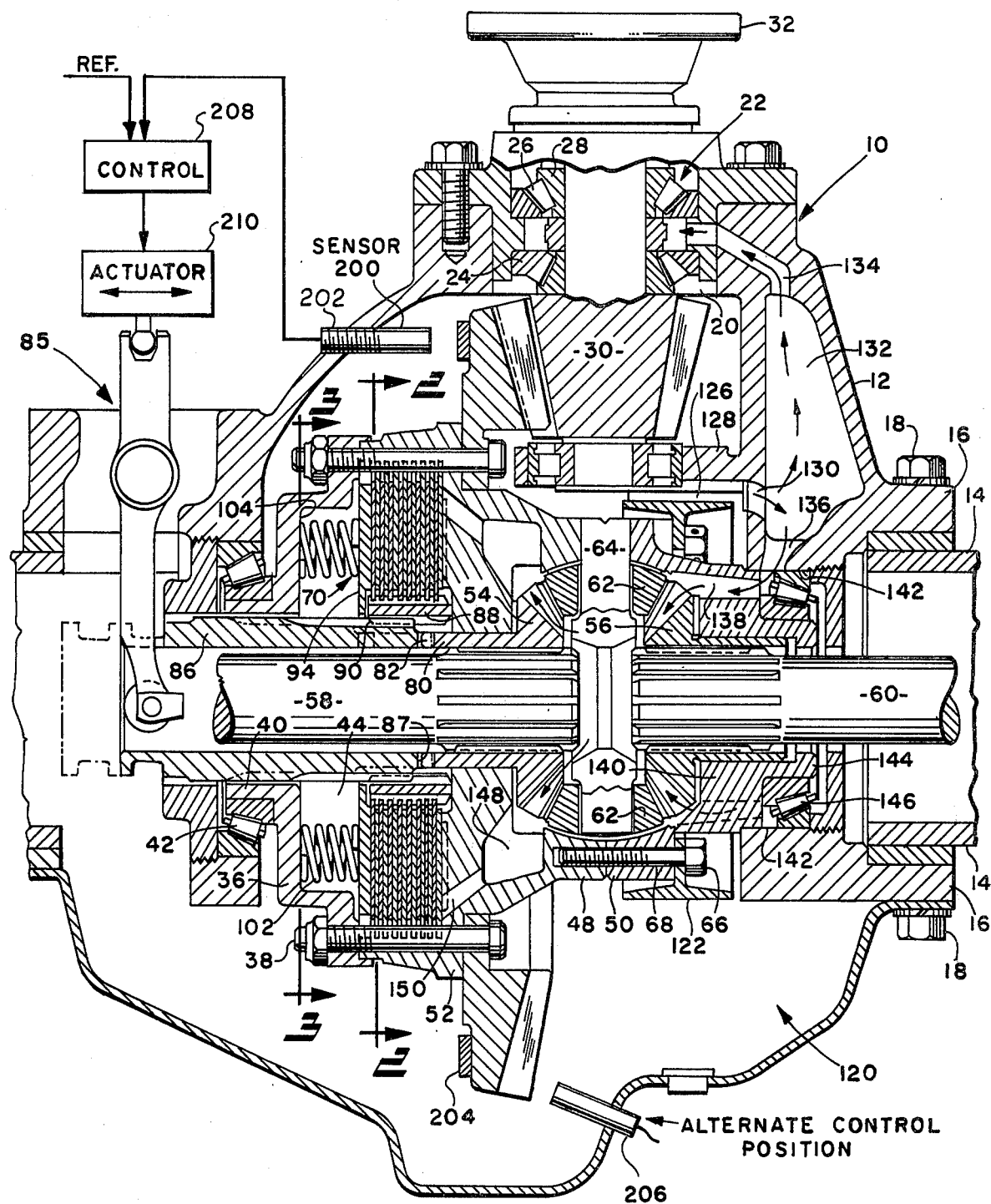
FIG. 1 is a cross-sectional view of one embodiment of the differential mechanism of the present invention.

Certain terminology will be used in the following description for convenience in reference only and will not be limited. The words "upwardly", "downwardly", "rightwardly", and "outwardly" will refer to the directions toward and away from, respectively, the geometric center of the device and designated parts thereof. Said terminology will include the words specifically mentioned, derivatives thereof, and words of similar import.

The present invention will be described in the embodiment of a limited slip differential mechanism similar to U.S. Pat. No. 3,448,635. In general, the described embodiment consists of providing a differential friction clutch assembly having a plurality of friction clutch discs splined to a power input member for rotation therewith cooperating with complementary alternate interleaved friction clutch discs splined to an elongated portion of a selectively actuable clutch means that is adapted to be engaged and disengaged to a differential output member. A plurality of springs are radially positioned about the geometric axis of the friction clutch discs for applying a predetermined force to the interleaved friction discs. An automatically actuable control means is provided for operatively connecting or disconnecting the friction clutch assembly, such that the biased friction discs may be operatively connected, respectively, to the differential cage and one of the differential output members to effectively restrain and/or retard relative rotation of the differential output members until one differential output member encounters a predetermined loss in resistance to rotation and tends to rotate relative to the other resulting in an unsafe load on the rotating axle shaft. And, should operating conditions warrant, the automatic control for the friction clutch assembly may be selectively disconnected by the operator and the differential will function as a conventional differential to equally divide the input torque between the output members thereof.

Thus, when the friction clutch assembly is engaged to the differential cage or one of the differential output members and a vehicle is moved in a normal straightahead path, wherein substantially no differential action is required, the friction clutch assembly and the differential rotate simultaneously as an integral unit and there is substantially no relative rotation between the side gears of the differential or between the friction clutch discs of the clutch assembly. Conversely, when one driven output shaft encounters less resistance to rotation and attempts to rotate relative to the other driven output shaft, this inclination is restrained by the frictional forces developed between the clutch discs and driving torque is continually made available to the other driven output shaft. It is readily apparent the magnitude of this effect depends on the total spring force of the compression springs employed which apply the force to the friction clutch discs and the characteristics of material employed to form the individual friction discs. The force on the friction clutch discs is accomplished by compressing the springs, from a free unloaded height to a specified and/or predetermined load height wherein the springs may apply a specific predetermined load to the friction clutch assembly.

In the present invention no axial displacement or movement of the differential side gears relative to the differential pinion gears occurs and the proper pitch line of rolling contact between the respective side gears and the pinion gears will remain substantially constantly uniform, thereby substantially eliminating the following disadvantages:

(1) The incident of fractured or broken gear teeth due to shock loading is substantially eliminated, such fractures being the result of increased backlash due to improper variation of the pitch line contact between the differential side and pinion gears; and (2) Misalignment of the gear teeth which causes stress concentrations in localized areas and progressive fatigue resulting in excessive gear teeth wear and eventually broken gear teeth.

While the preferred embodiment of the present invention is illustrated in connection with a limited slip differential, it is understood the invention is equally applicable to lock up type differentials, such as the type illustrated in U.S. Pat. No. 3,388,760, assigned to the assignee of this invention and hereby incorporated by reference. It is also understood that while the preferred embodiment of the present invention is illustrated in connection with a drive axle differential, the present invention is equally applicable to tandem axle interaxle differentials and to transfer case differentials.

Referring in greater detail to the drawings, wherein like numerals are used in the case of similar parts throughout the several views of the drawings, reference numeral 10 of FIG. 1 discloses an axle differential mechanism. A differential carrier 12 is fastened to the axle housing 14 by a peripheral flange portion 16 utilizing conventional means such as bolts 18. The differential carrier 12 is provided with opening 20 within which is disposed a bearing assembly 22 comprising outer race 24, bearings 26, and innerrace 28 which rotatably supports input pinion 30 connected by adapter flange 32 to a drive shaft (not shown) emanating from a conventional prime mover having a conventional clutch and change speed transmission mechanism.

A ring gear 34 in gear meshing relationship with output pinion 30 is connected to and rotatably supported on a housing or cup-form member 36 by a plurality of conventional fasteners, as bolts 38. The cup-form member 36 has an outwardly extending tubular or hub portion 40 which is rotatably supported in the differential carrier 12 by a plurality of anti-friction bearing means 42. The housing or cup-form member 36 and attached ring gear 34 together define a hollow substantially circular internal cavity or chamber 44. The differential case 36 comprises a two-piece case having a first case portion 48 and a second case portion 50 with the first case portion 48 being provided with a radially extending flange portion 52 having the ring gear 34 fixedly attached thereto by fasteners 38. A pair of differential bevel or side gears 54 and 56 are splined or otherwise structurally disposed on complementary splines or structure of differential output shafts 58 and 60 respectively, and have a plurality of teeth meshing with opposed complementary teeth on at least one pinion gear 62 which is rotatably mounted on differential pinion gear shaft 64 centrally positioned within differential case 36 and structurally secured thereto for rotation therewith. A plurality of fasteners 66, disposed in a plurality of complementary bores 68 secure the two halves 48 and 50 of the case 36 together. A friction clutch assembly including a biased multiple friction clutch pack 70 is positioned within the cavity 44. A selected number of friction discs 72 are provided with tab extensions 73 (see FIG. 2) having circular portions 76 in surrounding relationship to bolt means 38 which are secured to the ring gear 34. Thus, friction discs 72 are maintained in position by bolt means 38 and drivingly rotated with ring gear 34. An equal number of complementary friction discs 74 are splined to the intermediate clutch gear 88 and are interdigitated or interleaved with friction discs 72.

A hub portion 80 of side gear 54 having gear teeth 82 extends into cavity 44, automatically actuable clutch member 85 includes an annular sliding clutch member 86 having gear teeth 87 to selectively engage or disengage gear teeth 82 of side gear 54. Intermediate clutch gear member 88 and slide clutch member 86 have complementary gear teeth 90 which are in cooperating engagement when the sliding clutch member 86 is moved to the right (as in FIG. 1) and are disengaged when the sliding clutch member 86 is moved to the left. Thus, rightward movement of sliding clutch member 86 (as seen in FIG. 1) effects a gear meshing and torque transfer engaging relationship between gear teeth 90 through gear teeth 82 and 87 for simultaneous rotation of side gear 54, clutch member 86, clutch gear member 88 and the associated friction discs 74. Whereas, upon leftward movement as illustrated in broken or dashed lines in FIG. 1, sliding clutch member 86 disengages teeth 82 and 87 permitting relative rotation between gear 54 and sliding clutch member 86. The shift mechanism 85 can be actuated by conventional air, hydraulic, electric or air/electric shift control systems of the type which are utilized in effecting shifting of two-speed axle arrangements. It is readily apparent that sliding clutch member 86 and intermediate clutch gear element 88 may be constructed as an integral unit instead of two separate parts, for example, 86 and 88 as illustrated in FIG. 1.

Slidably receivable in cavity 44 (FIG. 1) is friction clutch assembly 70 including alternate interleaved friction discs or plates 72 and 74 interconnected to ring gear 34 by bolts 38 and intermediate clutch element 88 respectively. An axially slidable pressure plate 94 is positioned on one side (left) of the friction disc pack while the differential housing defines the other (right) side of the friction disc pack 70. Spring means 102 are resiliently compressed between surface 104 of differential casing 36 and pressure plate 94. In the embodiment shown in FIG. 1, a plurality of springs 102 are radially disposed in spaced relationship (See FIG. 3) about pressure plate 94 for exerting an inwardly, substantially constant force of a predetermined magnitude against plate 94, whereby a substantially uniform force is exerted against the surface of friction discs 72 and 74. Pressure plate 94 may be restrained from rotating relative to discs 72 and 74 by splines 106 which interfit or mesh with complementary splines on intermediate clutch element 88 or may be free to rotate relative to the discs.

Intermediate clutch element 88 is precluded from substantial axial movement by the confining limits of the pressure plate 94 and the differential housing.

Mounted in the differential carrier 12 is a single sensor 200 which may be threadably received in the carrier 12 as at 202 or may be carried by the carrier in any other suitable manner. The sensor may be electro magnetic, photoelectric or the like non-contacting sensors. Alternately, the sensor may be the input of a tach generator or the like. The sensor is located near a rotor 204 attached to the ring gear 34 for rotation therewith. The rotor 204 may be grooved, slotted, convoluted or of any other form to allow the sensor 200 to sense the rotation of the ring gear.

An alternate placement of the sensor is illustrated at 206 wherein the sensor is positioned to sense rotation of the ring gear by sensing rotation of the ring gear teeth.

The sensor 200 provides a first signal proportional to the rotational speed of the gear. The first signal is preferably an electrical signal having a frequency or voltage of a magnitude proportional to, or representative of, the rotational speed of the gear. This first signal is transmitted to the control 208 which converts the rotational speed first signal to a second signal of a magnitude proportional to acceleration of the ring gear and then compares the second signal to a predetermined maximum reference signal. Circuits which will differentiate the variable frequency or variable voltage first signal with respect to time to provide a second signal proportional to, or representative of, ring gear acceleration are well known in the art and an example thereof may be seen by reference to U.S. Pat. No. 3,966,267, assigned to the assignee of this invention and hereby incorporated by reference. The magnitude of the predetermined maximum reference signal is substantially equal to the magnitude of the second signal when acceleration of the ring gear is a predetermined maximum acceleration. The predetermined maximum acceleration is typically the maximum ring gear acceleration expected in the absence of a "spin out" condition. In the preferred embodiment, the reference signal is a fixed self-contained signal and the monitoring of system parameters other than acceleration of the monitored gear is not required. If the second signal exceeds the reference signal, i.e., the acceleration of the ring gear exceeds a predetermined maximum acceleration, the controller will cause the actuator 210 to shift the lever 85 whereby the sliding clutch member will be engaged. The actuator 210 may, of course, comprise a solenoid, air motor, fluid actuator, or the like. The control 208 may, of course, be of any commercially available type such as fluidic, electrical analog, electrical digital, or the like.

OPERATION

Although the operation of the limited slip differential device 10 embodying the invention has been disclosed somewhat above, the same will now be briefly described to ensure a full understanding of the invention. When the sliding clutch member 86 has been shifted to its rightmost position (see FIG. 1) by shifting means 85, the gear teeth 87 of the sliding clutch member 86 cooperatively engage the corresponding gear teeth 82 of the differential side gear member 54. Likewise, the corresponding gear teeth 90 of the sliding clutch member 86 and the intermediate clutch gear member 88 also are in cooperative engagement when the sliding clutch member 86 is shifted to its rightmost position, thereby effecting locking of the side gear member 54 to the ring gear member 34 through the before-mentioned cooperating gear teeth sets 82 and 87 and 90 through the friction disc plates 72 and 74, which locking arrangement precludes relative rotation of the side gear ring gears. The "locking" of the side gear 54 in effect also locks side gear 56 against relative rotation to the ring gear member 34 because the differential pinion gears 62 are then precluded from spinning about their mounting shafts 64. With the differential lock arrangement so engaged, the respective axle shafts 58 and 60 are rotated at the same speeds and transfer the same amount of torque to their driving wheels. Under certain road conditions as when one driving wheel would encounter a slippery or low friction surface, while the other driving wheel has a heavy load or torque requirement thereon, the relative loads or torque requirements on the respective axles is sufficient to overcome the frictional forces within the friction disc clutch pack (provided by spring biasing means 102) and effects an "unlocking" of the differential permitting relative rotation of the axle shafts and side gears. This before-described "unlocking" of the friction disc clutch pack is only attained upon a predetermined load or torque requirements on the respective drive wheels and under normal conditions would not occur. However, in the interest of preventing any overstressing of the axle shafts or the differential gears it is necessary to provide such a safety release of the limiting differential arrangement of the friction disc clutch pack. When the shifting means 85 has shifted the sliding clutch member 86 to its leftmost position (opposite that position seen in FIG. 1) the sliding clutch member 86 will have been removed from its cooperative engagement with the corresponding gear teeth of the side gear member 54 which will no longer be in "locked" engagement with the ring gear 34 as described hereinabove. In the "unlocked" or disengaged condition, the differential will function normally dividing the propelling effort of the input pinion 30 equally between the two driving wheels of the vehicle.

FIG. 4 illustrates an alternate embodiment of the present invention in which a single sensor provides a first signal proportional to angular velocity of a monitored gear which is converted into a second signal proportional to acceleration of the monitored gear to control the actuation of a differential lock up for the interaxle axle differential of a tandem axle mechanism. Tandem axle mechanisms utilizing positive locking type differentials are well known and a representative version may be seen by reference to U.S. Pat No. 3,388,760.

Briefly, the tandem axle mechanism 300 typically comprises a pair of driving axles (not shown) each of which receive power from a power divider 302 which includes an interaxle differential 304. A conventional lock up mechanism 306 will render the interaxle differential inoperative when actuated by shifting sliding clutch member 308 to the right to engage side gear 312. Sliding clutch member 308 is splined to the input shaft 310 as thus will rotationally lock the interaxle differential side gear 312 to the input shaft 310 to lock up the interaxle differential. Of course, other members such as the other side gear or the differential case may be positively engaged to the input shaft or to one another to effect a lock up of the interaxle differential 304.

A sensor 320 is mounted in the tandem axle assembly, preferably adjacent the monitored gear or monitored input member, such as the front rear drive axle ring gear 322 or the interaxle differential case to sense the rotational speed thereof. The sensor provides a first signal, proportional to rotational speed of the monitored gear or input member, to a control member 324. An alternate embodiment is illustrated in phantom lines wherein the control receives signals from a sensor 320' which is mounted to sense velocity of rear rear drive axle ring gear 322'. The control member 324 converts the first signal into a second signal proportional to monitored acceleration. The second signal is then compared to a reference signal corresponding to maximum monitored acceleration that is expected in the absence of a spin out condition. If the second signal exceeds the reference signal, the control will cause the actuator 326 to shift the sliding collar 308 to the right. Of course, when the acceleration sensed falls below the reference acceleration, the control will cause the actuator to shift collar 308 to the left to unlock the interaxle differential.

In both controls, 208 illustrated in FIG. 1 or 326 illustrated in FIG. 4, a time delay mechanism or the like may be utilized to prevent undesirable operating characteristics, such as cycles of rapid engagement and disengagement of the differential inhibiting clutch. Such time delay features are well known in prior art controls.

The reference signal may, of course, be permanently set, adjustable for various types of vehicles, adjustable by the operator to compensate for expected operating conditions and/or may automatically vary with vehicle speed or the like.

It should be readily apparent the embodiments of the present invention as described hereinabove function in a substantially similar manner and certain modifications, changes, and adaptations may be made in the disclosed structures and it is hereby intended to cover all such modifications, changes, adaptations and constructions which fall within the scope of the appended claims. For example, the limited slip differential arrangement of the embodiments disclosed and shown in the present invention, particularly the clutching arrangement with its friction discs, is adaptable to a two-speed axle notwithstanding the fact that the embodiments disclosed herein are all single speed axle constructions.

I claim:

1. An improved gear drive train mechanism including an automatically engaged and disengaged differential inhibiting mechanism of the type wherein a differential is prevented from free differentiation by the engagement of an inhibiting member in response to a preselected condition, said improvement comprising:
   a single sensor for monitoring the rotational speed of a monitored gear and for providing a first signal proportional to the rotational speed of the monitored gear;
   a control member for receiving said first signal and converting said first signal into a second signal proportional to rotational acceleration of the monitored gear; said control comparing said second signal to a reference signal; and
   an actuation member for engaging and disengaging said inhibiting member in response to said second signal exceeding or not exceeding said reference signal.

2. The improved mechanism of claim 1 wherein said preselected condition is a spin out condition and the magnitude of said reference signal substantially corresponds to the magnitude of said second signal at the maximum acceleration of said monitored gear expected in the absence of a spin out.

3. The improved mechanism of claim 2 wherein said gear drive train mechanism includes a tandem drive axle assembly having a pair of drive axles receiving power through a power divider having an interaxle differential, said inhibited differential being said interaxle differential.

4. The improved mechanism of claim 2 wherein said gear drive train mechanism includes a drive axle having a pair of wheels driven through differential gearing driven by a ring gear, said monitored gear is the drive axle ring gear and the inhibited differential is the differential gearing driven by the ring gear.

5. The improved mechanism of claim 4 wherein said actuation member includes a solenoid.

6. The improved mechanism of claim 4 wherein said actuation member includes a fluid motor.

7. The improved mechanism of claim 4 wherein said inhibitor is a dog clutch member for locking up said differential.

8. The improved mechanism of claim 4 wherein said drive axle includes a spring loaded friction clutch means and said inhibitor is a positive clutch means for drivingly connecting said differential to one of said pairs of wheels through said friction clutch means for limited slip operation of said differential.

9. The improved mechanism of claim 4 wherein said control includes time delay means for retaining said inhibitor means in engagement for at least a minimum period of time after initial engagement thereof.

10. The improved mechanism of claim 4 wherein said sensor is an electromagnetic sensor and said ring gear includes an irregular surface which will rotate past said sensor to provide said first signal.

11. The improved mechanism of claim 10 wherein said irregular surface comprises a convoluted rotor mounted for rotation with said ring gear.

12. The improved mechanism of claim 10 wherein said irregular surface comprises a slotted rotor mounted for rotation with said ring gear.

13. The improved mechanism of claim 10 wherein said irregular surface comprises the gear teeth of the ring gear.

14. A drive mechanism including a housing having therein torque transmitting means including:
  power input means for driving a differential case, said power input means including a ring gear;
  said differential case containing a differential drive means having at least two driven output gears;
  first spring loaded friction clutch means mounted internally of the differential case;
  second rotatable clutch means operable between an engaged position for operatively connecting and a disengaged position for operatively disconnecting the spring loaded friction clutch means to at least one of said driven output gears;
  the spring loaded friction clutch means comprising:
  (a) a first friction clutch member secured to the power input means for rotation therewith and a second friction clutch member structurally connected to a portion of said second clutch means for rotation therewith; and
  (b) spring means for continuously loading the first and second friction clutch members into an engaged friction driving relationship for transmitting uniform drive torque from the power input means to said driven output gears when the second clutch means is operatively engaged; and
  control means coacting with the second clutch means for automatically effecting engagement or disengagement of said second clutch means in response to preselected conditions indicating a loss of traction at the wheels driven by one of the output gears, said control means comprising:
  (a) a sensor located in said housing adjacent said ring gear for supplying a first signal having a magnitude proportional to the rotational speed of the ring gear;
  (b) a converter for converting said first signal into a second signal having a magnitude proportional to the rotational acceleration of the ring gear;
  (c) a control for comparing said second signal to a reference signal having a magnitude corresponding to the magnitude of the second signal at maximum rotational acceleration of said ring gear expected in the absence of a loss of traction; and
  (d) an actuator for engaging said second clutch when the magnitude of said second signal exceeds the magnitude of said reference signal and for disengaging said second clutch when the magnitude of said second signal does not exceed the magnitude of said reference signal.

15. The drive mechanism as recited in claim 14 wherein:
  said first and second friction clutch members are adapted to rotate relative to each other when said friction loading is overcome, permitting relative rotation of one said driven output gears to the other.

16. The drive mechanism as recited in claim 15 wherein:
  the power input means includes a power input pinion in gear meshing drive relationship with the ring gear that is connected by a plurality of fastener means to the differential case; and
  the first friction clutch member being drivingly connected to at least one of said ring gear fastener means for rotation therewith at a common speed.

* * * * *